March 13, 1962

T. F. SARAH 3,025,020

CRANK-OPERATED DRAG FOR SPINNING REEL

Filed Dec. 15, 1959

INVENTOR.
THOMAS F. SARAH
BY *Ely, Frye & Hamilton*

ATTORNEYS

March 13, 1962
T. F. SARAH
3,025,020
CRANK-OPERATED DRAG FOR SPINNING REEL
Filed Dec. 15, 1959
2 Sheets-Sheet 2
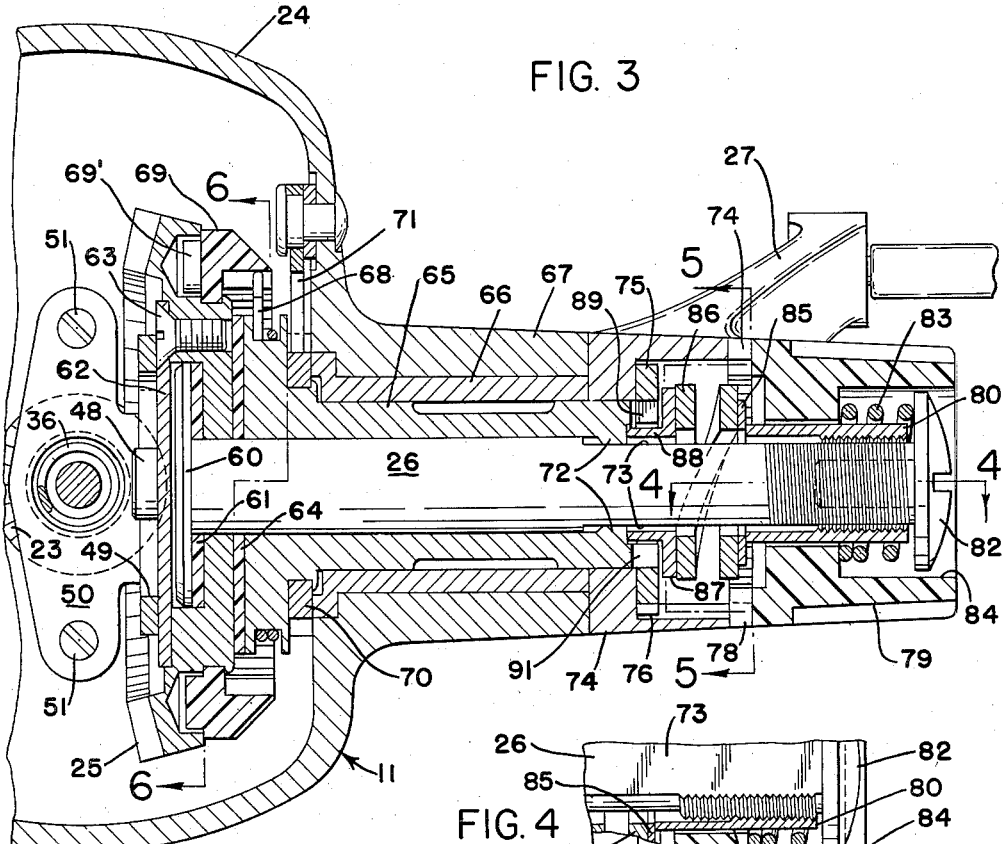
FIG. 3
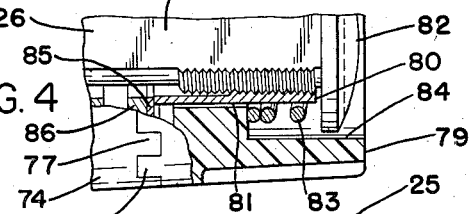
FIG. 4
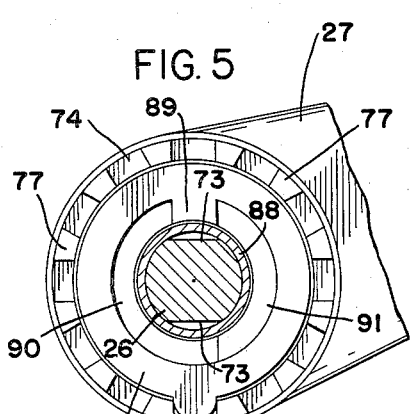
FIG. 5
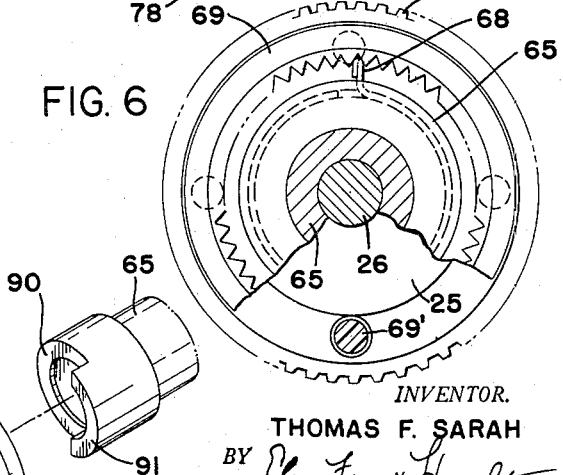
FIG. 6
FIG. 7
INVENTOR.
THOMAS F. SARAH
BY Ely, Frye & Hamilton
ATTORNEYS 3,025,020
CRANK-OPERATED DRAG FOR SPINNING REEL
Thomas F. Sarah, Akron, Ohio, assignor to The Enterprise Manufacturing Company, Akron, Ohio, a corporation of Ohio
Filed Dec. 15, 1959, Ser. No. 859,655
11 Claims. (Cl. 242—84.45)

The invention relates generally to drag or brake mechanisms for spinning reels, and more particularly to an improved drag which is varied by a partial turn of the crank handle.

The purpose of a drag or brake in a fishing reel is to allow the line to pay out when the pull exerted by the fish overcomes the frictional resistance of the drag. A conventional drag mechanism comprises friction disks interposed between the crank handle and the drive gear in such manner that a friction drive is provided for retrieving the line. The amount of friction or drag is adjusted by turning an adjusting nut or star wheel on the exterior of the reel, so that the fisherman can play the fish by allowing it to run, and so that the line does not break when the pull of the fish exceeds the test strength of the line.

In a spinning reel, and particularly a closed face type of spinning reel, the line makes several sharp turns as it passes from the spool over the rotating flyer and is snubbed around the pick up pin on the flyer, and then passes through the line guide opening in the closed face of the reel. These sharp turns or bends in the line increase the amount of pull required to allow a fish to run, as well as the amount of pull necessary to retrieve the line.

Accordingly, in playing a fish with this type of reel, the fisherman may repeatedly decrease the amount of drag to let the fish run and alternately increase the amount of drag to enable retrieving the line, and this operation is difficult to perform because it requires letting go of the crank handle while turning the adjusting nut and momentarily losing control of the fish.

An object of the present invention is to provide improved means for decreasing the drag by a partial reverse turn of the crank handle and for increasing the amount of drag by a partial forward turn of the crank handle.

Another object is to provide means for independently adjusting the initial amount of drag.

A further object is to provide means for limiting the variation in drag obtainable by movement of the crank handle to a predetermined amount.

The foregoing objectives are accomplished in a simple and inexpensive construction having a minimum number of parts, and easily adaptable to conventional spinning reels. A preferred embodiment of the improved construction is shown by way of example in the accompanying drawings and described in detail herein. Various modifications and changes in details of construction are embodied within the scope of the invention defined in the claims appended hereto.

Referring to the drawings:

FIG. 3 is a further enlarged sectional view on line 3—3 of FIG. 1.

FIG. 4 is a fragmentary sectional view on line 4—4 of FIG. 3.

FIG. 5 is a transverse sectional view on line 5—5 of FIG. 3.

FIG. 6 is a reduced transverse sectional view on line 6—6 of FIG. 3.

FIG. 7 is an exploded perspective view of the parts for limiting variation of the drag by movement of the crank handle.

Figure 1:
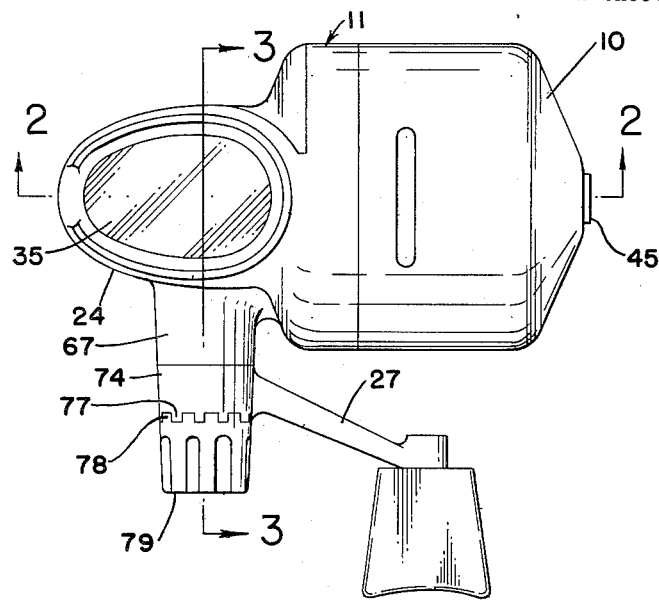
FIG. 1 is an elevation of a closed face spinning reel embodying the improved crank-operated drag.
Figure 2:
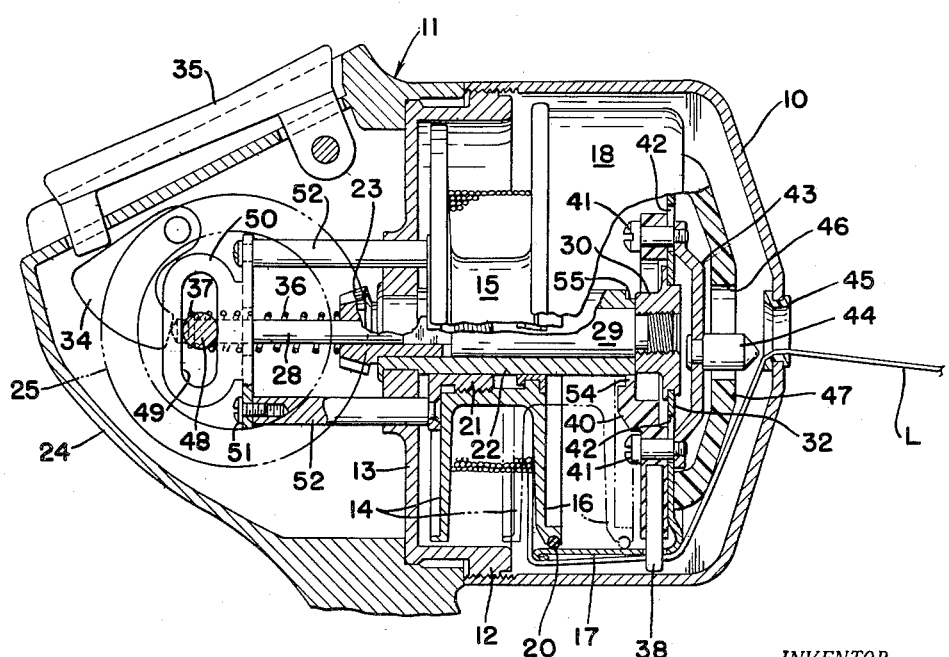
FIG. 2 is an enlarged sectional view on line 2—2 of FIG. 1.

The reel shown in FIGS. 1 and 2 preferably has a closed face or cap 10 fitting onto the front open end of a housing 11. As shown, the cap 10 may be screwed onto the annular flange 12 of a cup-shaped partition wall 13 into which the rear flange 14 of the spool 15 is retractible. The front flange 16 of the spool is received within the annular skirt 17 of a flyer 18 rotatably mounted within the cap 10, and a wiper ring 20 is provided on the front spool flange to slide back and forth on the flange 17, and guard against entry of the line into the flyer.

The hub 21 of the spool is journaled on a tubular spool shaft 22, which is secured in partition wall 13 and has a bevel drive pinion 23 journaled in its rear end extending into the gear compartment 24 of the housing. A bevel drive gear 25 meshes with pinion 23 and is mounted on a shaft 26 (FIG. 3) for rotation by the crank handle 27. The pinion 23 is splined to the reduced portion 28 of a shaft 29 journaled in spool shaft 22 to drive the shaft 29 while allowing axial movement thereof.

The front end of shaft 29 has a nut 30 screwed thereon, and the front web flange 32 of the flyer 18 is secured to the nut 30. Shaft 29 extends rearwardly in gear compartment 24 into abutment with a lever arm 34 which is arranged to be actuated by a push button lever 35 on the exterior of the gear compartment. A helical spring 36 interposed between pinion 23 and a washer 37 on the rear end of shaft 33 urges the shaft rearwardly against lever arm 34.

A pick up pin 38 projects radially of the flyer 18 through a hole in the flange 17, and the pin is carried in a slide 40 movable radially on the inside of the front web 32. Screws 41 in the slide extend slidably through radial slots 42 in the web and connect with the ends of a bridge piece 43 arched over the front end of nut 30. The bridge 43 carries a centering pin 44 having a tapered nose and adapted to engage the side of the line guide eyelet 45 in the cap 10 when the flyer is moved forwardly. Preferably, the centering pin 44 is slidable radially in a slot 46 in a rubber bumper 47 mounted on the web 32 for abutting the inner surface of the cap 10.

Means is provided to level wind the line L on the spool 15, and comprises an eccentric pin 48 on the inner face of gear 25 which rides in a cam slot 49 in bracket 50. The bracket 50 is attached by screws 51 to two posts 52 slidable through partition wall 13 and connected to spool 15. Hence, rotation of gear 25 causes reciprocation of the spool 15, as indicated in phantom lines in FIG. 2, at the same time the flyer 18 is rotated to wind the line upon the spool.

In making a cast with the reel, assuming that the parts are in the position shown in FIG. 2, the fisherman presses inwardly on button 35 and holds it in until the cast is started, forcing the centering pin 44 into line guide 45 and retracting pick up pin 38. As the pin 44 enters the guide it snubs the line and then slides or "cams" laterally over the guide until it retracts the pick up pin from engaging the line, at which time the line is snubbed by bumper 47 against the inside of the cap. As the shaft 29 moves forwardly to contact pin 44 with line guide 45, the nut 30 moves away from the front end of shaft 22 and allows the flange 54 on slide 40 to move radially in front of shaft 22 with the lateral centering movement of pin 44.

As the cast is made, the fisherman releases the button 35, and the spring 36 moves the shaft 29 and flyer rearwardly to release the line and allow it to spin from the spool. When rewinding is started by turning the crank handle 27, the flange 54 on the slide enters the eccentric cam groove 55 in the end of shaft 22 and returns the slide 40 to the position of FIG. 2, ejecting the pick up pin for engaging the line and winding it on the spool as the flyer is rotated.

The parts thus far described per se form no part of the present invention.

The drag mechanism and improved adjusting means therefor as shown in FIGS. 3–7. The gear 25 is journaled on shaft 26 which has a circular flange 60 at its inner end fitting within a recess in the gear face. Between the flange 60 and the base of the recess is a friction brake disk 61 journaled on shaft 26, and a plate 62 is secured to the inner face of the gear by screws 63 and overlies the flange 60. The eccentric pin 48 is carried on the plate 62.

The outer face of the gear is abutted by a second friction brake disk 64 journaled on shaft 26. The brake disks 61 and 64 may be of nylon or other suitable material. Disk 64 abuts the inner end of a drive sleeve 65 journaled in a bushing 66 in the housing neck 67. A click spring 68 is located in an annular groove around the inner end of sleeve 65, and has its inner end anchored to the sleeve and its outer end engaging the toothed inner annular surface of a ratchet wheel 69 keyed to the gear by lugs 69'. Thus, when the gear 25 turns relative to the sleeve 65, the click of the spring ratcheting over the teeth of the ratchet wheel 69 warns the fisherman.

An anti-reverse ratchet wheel 70 is secured on sleeve 65, and an anti-reverse pawl 71 movably mounted on the housing 24 engages the wheel 70 to permit rotation of the sleeve 65 in line-retrieving direction and to prevent reverse rotation thereof.

At its outer end the sleeve 65 is splined to shaft 26 by means of inturned lugs 72 on the sleeve slidably fitting flatted portions 73 on the shaft, so that the shaft 26 rotates with sleeve 65 but is axially slidable therein. The hub 74 of crank handle 27 is rotatable on the outer end of sleeve 65 and has an outer annular flange in which a washer 75 is keyed at 76. The outer end of hub 74 is provided with teeth 77 meshing with teeth 78 on the inner end of an adjusting turn button 79.

The button 79 has a serrated outer surface for gripping with the fingers and may be made of plastic material such as nylon. The button 79 is splined on an inner nut 80 by means of a flatted hole in the button fitting diametrically opposite flats 81 on nut 80. The nut 80 is screwed on the outer end of shaft 26, and the shaft has a threaded bore into which a screw 82 is threaded for retaining a spring 83 surrounding the nut 80 and abutting the base of a recess 84 in the turn button to hold the button against the hub 74.

The inner end of nut 80 abuts a spring washer 85 which is dished to take up play, and the washer abuts the outer end of a stiff helical brake spring 86, the inner end of which abuts a flanged spacer washer 87 having an inner sleeve portion 88 abutting the outer end of sleeve 65. The sleeve portion 88 has sufficient axial length to allow axial adjustment of sleeve 65 without binding crank hub 74. The washer 75, which is keyed at its outer periphery to hub 74, has a lug 89 on its inner periphery rotatable in a substantially semi-circular slot 90 in the end of sleeve 65 when the handle 27 is turned. The slot 90 forms a circumferential shoulder 91 in the end of shaft 65 forming a stop for the lug, and the lug 89 and shoulder 91 constitute interengaging lost-motion drive means permitting a partial turn of the crank handle relative to the sleeve when the sleeve is held against rotation.

In the operation of the improved reel the button 79 is pulled outwardly against spring 83 to withdraw the teeth 78 from engagement with teeth 77 on crank hub 74, and the button is turned to tighten or loosen nut 80 on the threads of shaft 26 to adjust the initial tension as desired on the brake disks 61 and 64, the thrust of nut 80 being transmitted through spring 86 and washer 88 to sleeve 65. When the button is released the spring 83 returns it to mesh the teeth 77 and 78.

Now, if a cast is made in the manner previously described and a fish is hooked, the fisherman starts to retrieve the line by turning the crank forwardly. At any time the fisherman may decrease the amount of drag to allow the fish to run merely by giving the crank handle a partial reverse turn. This is desirable because the bends in line L as it passes from the spool over the skirt 17 and around the pick up pin 38 through line guide 45 increase the pull required to pay out the line.

As the crank is turned in reverse, the anti-reverse ratchet 70 and pawl 71 will prevent turning of the sleeve 65 and shaft 26, and the crank handle will turn the button 79 and loosen the nut 80 on the threads of shaft 26, decreasing the thrust on sleeve 65 and brake disks 61 and 64 to allow easier relative turning of gear 25 and flyer 18 to pay out the line. The amount the drag can be decreased is predetermined by the travel of lug 89 of washer 75 in circular slot 90 of sleeve 65, which is approximately 180° from one end of the shoulder 91 to the other, because the sleeve 65 is held from turning in reverse by the anti-reverse ratchet mechanism.

Forward turning of the crank through about one-half turn will return the lug to the other end of the slot 90 and increase the thrust on the brake disks to allow retrieving of the line as desired, and the fisherman may repeatedly decrease and again increase the drag in this manner to play the fish as he desires. If the pull on the line is decreased after a reverse half turn, as by the fish becoming unhooked, the line may be wound on the spool with the decreased drag until sufficient pull is again exerted to hold the winding mechanism while the crank turns to tighten the adjusting nut 80.

It will be seen that the present invention provides an inexpensive construction having novel drag adjusting means operated by a partial turn of the crank handle so that a fisherman may repeatedly vary the drag a limited amount without letting go of the crank handle, in addition to providing independent adjusting means for setting the initial amount of drag.

What is claimed is:

1. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft for exerting axial thrust against said drive sleeve, a crank handle journaled on said sleeve and operatively connected to said nut for turning the nut, and interengaging lost-motion drive means between said handle and sleeve for permitting a partial rotation of said handle relative to said sleeve to adjust the axial thrust on said sleeve.

2. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft, a spring interposed between said nut and drive sleeve for transmitting the axial thrust of said nut, a crank handle journaled on said sleeve and operatively connected to said nut for turning the nut, and interengaging lost-motion drive means between said handle and sleeve for permitting a partial rotation of said handle relative to said sleeve to adjust the axial thrust on said sleeve.

3. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft for exerting axial thrust against said drive sleeve, a crank handle journaled on said sleeve, a turn button splined to said nut and non-rotatively engageable with said handle, spring means holding said button in driving engagement with said handle, and interengageable lost-motion drive means between said crank handle and sleeve to permit a partial rotation of said handle relative to said sleeve to adjust the axial thrust on said sleeve.

4. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft, a spring interposed between said nut and drive sleeve for transmitting axial thrust of said nut, a crank handle journaled on said sleeve, a turn button splined to said nut and non-rotatively engageable with said handle, spring means holding said button in driving engagement with said handle, and interengageable lost-motion drive means between said crank handle and sleeve to permit a partial rotation of said handle relative to said sleeve to adjust the axial thrust on said sleeve.

5. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft for exerting axial thrust against said drive sleeve, a crank handle journaled on said sleeve and operatively connected to said nut for turning the nut, and a washer keyed to said handle and having a lost-motion drive connection with said sleeve for permitting partial rotation of said handle relative to said sleeve to adjust the axial thrust on said sleeve.

6. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft, a spring interposed between said nut and drive sleeve for transmitting the axial thrust of said nut, a crank handle journaled on said sleeve and operatively connected to said nut for turning the nut, and a washer keyed to said handle and having a lost-motion drive connection with said sleeve for permitting partial rotation of said handle relative to said sleeve to adjust the axial thrust on said sleeve.

7. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft for exerting axial thrust against said drive sleeve, a crank handle journaled on said sleeve and operatively connected to said nut for turning the nut, a washer keyed to said handle and having a lost-motion drive connection with said sleeve for permitting partial rotation of said handle relative to said sleeve, a thrust member extending through said washer into abutment with said sleeve, and a spring interposed between said thrust member and said nut.

8. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft for exerting axial thrust against said drive sleeve, a crank handle journaled on said sleeve and operatively connected to said nut for turning the nut, a washer keyed to said handle having an internal lug, and an arcuate slot in said sleeve receiving said lug and permitting partial rotation of said handle relative to said sleeve to adjust the axial thrust on said sleeve.

9. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft, a spring interposed between said nut and drive sleeve for transmitting the axial thrust of said nut, a crank handle journaled on said sleeve and operatively connected to said nut for turning the nut, a washer keyed to said handle having an internal lug, and an arcuate slot in said sleeve receiving said lug and permitting partial rotation of said handle relative to said sleeve to adjust the axial thrust on said sleeve.

10. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft for exerting axial thrust against said drive sleeve, a crank handle journaled on said sleeve, a turn button splined to said nut and non-rotatively engageable with said handle, spring means holding said button in driving engagement with said handle, and a washer keyed to said handle and having a lost-motion drive connection with said sleeve for permitting partial rotation of said handle relative to said sleeve to adjust the axial thrust on said sleeve.

11. In a spinning reel having a drive gear and a friction brake disk abutting the gear face, crank-operated mechanism for varying the braking pressure applied to said disk, said mechanism comprising a shaft extending from said gear, a drive sleeve splined to said shaft for applying axial thrust to said disk, an adjusting nut threaded on said shaft, a spring interposed between said nut and drive sleeve for transmitting axial thrust of said nut, a crank handle journaled on said sleeve, a turn button splined to said nut and non-rotatively engageable with said handle, spring means holding said button in driving engagement with said handle, and a washer keyed to said handle and having a lost-motion drive connection with said sleeve for permitting partial rotation of said handle relative to said sleeve to adjust the axial thrust on said sleeve.

References Cited in the file of this patent

UNITED STATES PATENTS

| 2,249,297 | Muffett | July 15, 1941 |
| 2,896,874 | Nurmse | July 28, 1959 |
| 2,922,595 | Holahan | Jan. 26, 1960 |
| 2,925,964 | Holahan | Feb. 23, 1960 |

FOREIGN PATENTS

| 589,703 | France | Feb. 26, 1925 |